(12) United States Patent
Arvo

(10) Patent No.: US 7,995,059 B1
(45) Date of Patent: Aug. 9, 2011

(54) MID-FIELD AND FAR-FIELD IRRADIANCE APPROXIMATION

(75) Inventor: Jim Arvo, Pasadena, CA (US)

(73) Assignee: Pixar, Emeryville, CA (US)

( * ) Notice: Subject to any disclaimer, the term of this patent is extended or adjusted under 35 U.S.C. 154(b) by 954 days.

(21) Appl. No.: 11/760,522

(22) Filed: Jun. 8, 2007

Related U.S. Application Data

(60) Provisional application No. 60/812,271, filed on Jun. 9, 2006.

(51) Int. Cl.
*G06T 15/00* (2011.01)
(52) U.S. Cl. ........ 345/426; 345/419; 345/427; 345/581; 345/582; 382/117; 356/511
(58) Field of Classification Search .......... 345/419, 345/426, 581, 582, 427; 382/117; 356/511
See application file for complete search history.

(56) References Cited

U.S. PATENT DOCUMENTS

| | | | |
|---|---|---|---|
| 6,567,083 B1 * | 5/2003 | Baum et al. | 345/426 |
| 6,587,276 B2 * | 7/2003 | Daniell | 359/622 |
| 7,286,214 B2 * | 10/2007 | Reinersman et al. | 356/214 |
| 7,460,985 B2 * | 12/2008 | Benitez et al. | 703/2 |

OTHER PUBLICATIONS

Krivanek et al. "Radiance Caching for Efficient Global Illumination Computation", IEEE, 2005.*
Smyk et al. "Temporally Coherent Irradiance Caching for High Quality Animation Rendering", EUROGRAPHICS 2005.*
Arikan et al. "Fast and Detailed Approximate Global Illumination by Irradiance Decomposition", ACM 2005.*
Tabellion et al. "An Approximate Global Illumination System for Computer Generated Films", ACM 2004.*
Ravi Ramamoorthi et al. "Frequency Space Environment Map Rendering". ACM 2002.*
Sloan et al. "Precomputed Radiance Transfer for Real-Time Rendering in Dynamic, Low-Frequency Lighting Environments". ACM 2002.*
Ravi Ramamoorthi et al. "An Efficient Representation for Irradiance Environment Maps", ACM 2001.*
Ravi Ramamoorthi et al. "On the relationship between radiance and irradiance: determining the illumination from images of a convex Lambertian object". Published 2001.*

* cited by examiner

*Primary Examiner* — Kimbinh T Nguyen
(74) *Attorney, Agent, or Firm* — Kilpatrick Townsend & Stockton, LLP; Philip H. Albert

(57) ABSTRACT

A method for a computer system includes retrieving from a computer readable medium a first irradiance approximation for a plurality of light sources for a first distance in the midfield from the light sources; retrieving from the computer readable medium a second irradiance approximation for the plurality of light sources for a second distance in the farfield, where the second distance is greater than the first distance; and interpolating the first irradiance approximation and the second irradiance approximation to generate a third irradiance approximation for a point having a third distance from the light sources.

24 Claims, 4 Drawing Sheets

$$\Phi(\bar{p},\bar{n}) \approx 1/r^2 [Y_1(\bar{u}),\ldots,Y_{16}(\bar{u})] \begin{bmatrix} \ast\ast\ast \\ \vdots \\ \ast\ast\ast \end{bmatrix}_{16\times 9} \begin{bmatrix} \ast\ast\ast \\ \vdots \\ \ast\ast\ast \end{bmatrix}_{9\times 3} \begin{bmatrix} C_0 \\ C_1 \\ C_2 \end{bmatrix}_{3\times 1}$$

MID-FIELD AND FAR-FIELD IRRADIANCE APPROXIMATION

CROSS-REFERENCES TO RELATED APPLICATIONS

This application claims priority to U.S. Provisional Patent Application No. 60/812,298, filed Jun. 9, 2006, titled "MID-FIELD AND FAR-FIELD IRRADIANCE APPROXIMATION," and U.S. Provisional Patent Application No. 60/812,271, filed Jun. 9, 2006, titled "MID-FIELD AND FAR-FIELD IRRADIANCE APPROXIMATION," both of Jim Arvo and both of which are incorporated by reference herein in their entireties for all purposes.

BACKGROUND OF THE INVENTION

The present invention relates to computer animation. More particularly, the present invention relates to characterizing a set of light sources to render an object in a scene illuminated by the set of light sources.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the latter part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer-aided animation (CA) industry was Pixar. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006) and others. In addition to creating animated features, Pixar developed computing platforms specially designed for CA, and CA software now known as RenderMan®. RenderMan® was particularly well received in the animation industry and recognized with two Academy Awards®. The RenderMan® software included a "rendering engine" that "rendered" or converted geometric and/or mathematical descriptions of objects into a two-dimensional image. The named inventor of the present invention co-developed the original RenderMan® software.

Reducing rendering time is very important for computer animation. The rendering process can be a time consuming operation that may take hours, if not days, when rendering a scene with many objects. As an example, if a scene included ten thousand light sources, the rendering engine might have made ten thousand squared calculations to render a pixel in a scene. Accordingly, the time to render such a scene would be unacceptably long. Multiplying this rendering time by the number of frames (e.g. 130,000) in a typical feature-length animated feature of images results in a rendering time that is impractical.

Another technique considered to attempt to reduce the rendering time has been through an approximation that light sources are infinitely far from an illuminated object. One drawback of this approximation is that mid-field illumination effects are not taken into account. Accordingly, illuminated objects may not be rendered sufficiently accurately to satisfy viewers of an animated feature.

Therefore, new methods and apparatus are needed for approximating light sources and/or objects illuminated by the lights such that these methods and apparatus may be used to substantially realistically render the objects in animated scenes.

BRIEF SUMMARY OF THE CLAIMED EMBODIMENTS

The present invention provides a method and apparatus for computer animation. More particularly, the present invention provides a method and apparatus for characterizing a set of light sources to render an object in a scene illuminated by the set of light sources.

A method for a computer system includes retrieving from a computer readable medium a first irradiance approximation for a plurality of light sources for a first distance in the midfield from the light sources; retrieving from the computer readable medium a second irradiance approximation for the plurality of light sources for a second distance in the farfield, where the second distance is greater than the first distance; and interpolating the first irradiance approximation and the second irradiance approximation to generate a third irradiance approximation for a point having a third distance from the light sources.

According to a specific embodiment of the present invention, the third distance is greater than the first distance and less than the second distance. According to another specific embodiment of the present invention, the method further comprises rendering an image for the point based on interpolation step. The first irradiance approximation is for a first sphere around the plurality of light sources; and wherein the second irradiance approximation is for a second sphere around the plurality of light sources.

According to another specific embodiment of the present invention, the interpolating step includes: diminishing the irradiance associated with the first irradiance approximation with a first function of a first radial distance from the first sphere to the point, and diminishing the irradiance associated with the second irradiance approximation with a second function of a second radial distance from the second sphere to the point. The first function diminishes the irradiance associated with the first irradiance approximation at a higher rate than the second function diminishes the irradiance associated with the second irradiance approximation. The first function is proportional to the inverse of the first radial distance cubed, and the second function is proportional to the inverse of the second radial distance squared.

A better understanding of the nature and advantages of the present invention may be gained with reference to the following detailed description and the accompanying drawings.

DETAILED DESCRIPTION OF THE INVENTION

The present invention provides a method and apparatus for computer animation. More particularly, the present invention provides a method and apparatus for characterizing a set of light sources to render an object in a scene illuminated by a set of light sources.

Figure 1:
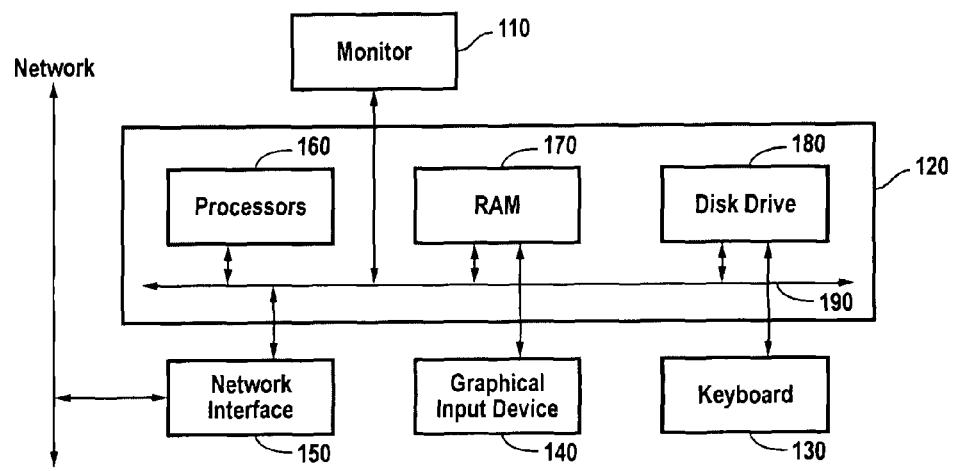
FIG. 1 is a block diagram of a typical computer system according to an embodiment of the present invention.

FIG. 1 is a block diagram of a typical computer system 100 according to an embodiment of the present invention.

In the present embodiment, computer system 100 typically includes a monitor 110, computer 120, a keyboard 130, a user input device 140, computer interfaces 150, and the like.

In the present embodiment, user input device 140 is typically embodied as a computer mouse, a trackball, a track pad, a joystick, wireless remote, drawing tablet, voice command system, eye tracking system, and the like. User input device 140 typically allows a user to select objects, icons, text and the like that appear on the monitor 110 via a command such as a click of a button or the like.

Embodiments of computer interface 150 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 150 may be physically integrated on the motherboard of computer 120, may be a software program, such as soft DSL, or the like.

In various embodiments, computer 120 typically includes familiar computer components such as a processor 160, and memory storage devices, such as a random access memory (RAM) 170, disk drives 180, and system bus 190 interconnecting the above components.

In one embodiment, computer 120 includes one or more Xeon microprocessors from Intel. Further, in the present embodiment, computer 120 typically includes a UNIX-based operating system.

RAM 170 and disk drive 180 are examples of tangible media configured to store data such as image files, models including geometrical descriptions of objects, ordered geometric descriptions of objects, procedural descriptions of models, scene descriptor files, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Xeon™, Pentium™ or Core™ microprocessors; Turion™ 64, Opteron™ or Athlon64™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board (e.g. graphics processor unit).

Figure 2:
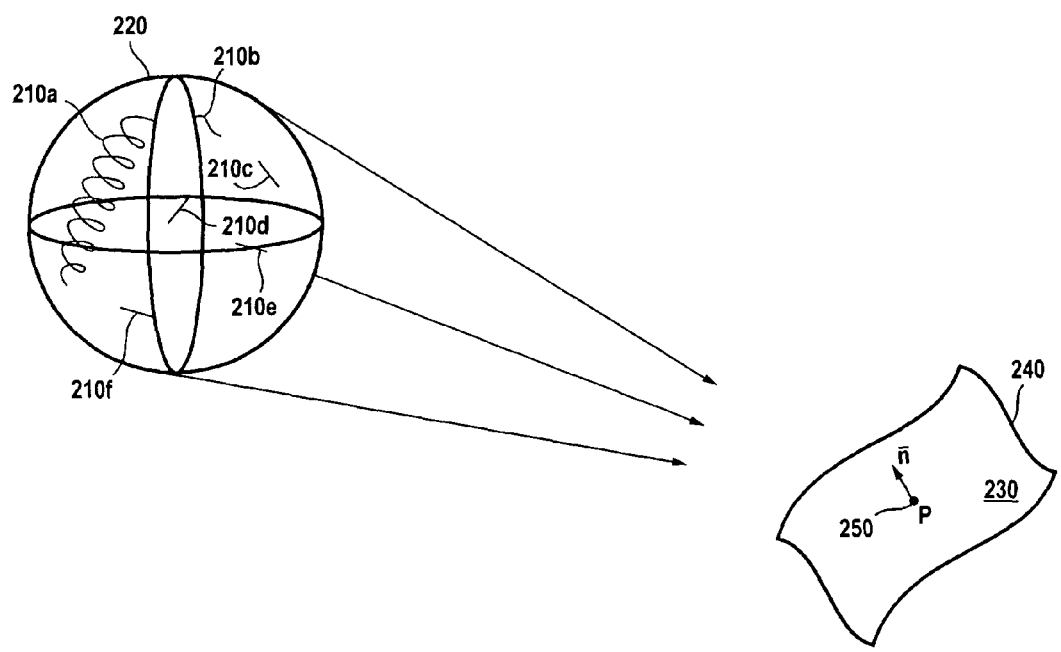
FIG. 2 illustrates a simplified diagram of a computer based illumination process according to one embodiment of the present invention.

FIG. 2 illustrates a simplified diagram of a computer based illumination process according to one embodiment of the present invention.

More specifically, the diagram shown in FIG. 2 includes a plurality of light sources 210 that is bounded by a modeled sphere 220. The light sources are labeled with the base reference 210 and an alphabetic suffix. While 6 light sources are shown in FIG. 2, there may be hundreds, thousands or more light sources in the sphere. The light sources might include a plurality of "line lights" or sources having other shapes. The light sources are configured to illuminate a surface 230 of an object 240. Each of the plurality of light sources, the sphere, and the object are computer objects, and various computer based embodiments of the present inventions are configured for determining the illumination of the surface by the plurality of light sources.

As shown in FIG. 2, the light sources are inside the sphere and the irradiance of the light sources on the sphere and outward from the sphere is approximated according to methods described herein. Determining the irradiance on the sphere and outward from the sphere provides that the irradiance on surface 230 may be determined relatively simply subsequent to determining the irradiance on the sphere and outward therefrom. For convenience the sphere is centered on the origin of a coordinate system, and is modeled to have a unit radius.

As referred to herein irradiance includes the measure of the power (due to incident illumination) that reaches a surface per unit area. That is, irradiance includes the density of incident radiant energy. Irradiance is largely insensitive to how the incident energy is distributed; it lumps it all together into one constant. That constant is useful for determining how much power per unit area (again, a density) will be reflected from a surface; specifically, from a completely diffuse surface, which scatters light equally in all direction. Hence, the methods described herein are applicable to diffuse surfaces that are sufficiently separated from the light sources (e.g., separations for the mid-field and far-field).

Irradiance as referred to herein implies a diffuse surfaces, and far-field implies well-separated from a cluster of lights. "Well-separated" will be well understood by those of skill in the art. If those two conditions pertain, then the methods described herein work well to approximate the light reflected from the surfaces due to the light sources. The methods described herein also work well to approximate the light reflected from a surface due to the light sources if the light sources behave somewhat "physically" in that their power falls off according to an inverse square law, as do real light sources.

The plurality of line lights may be used to approximate the illumination from a neon light or the like. Line lights are two dimensional objects (or lines) that are modeled to emit light. As the modeled sphere surrounds the light sources, the sphere is considered to be in the mid-field. Mid-field includes those distances from the light sources at which irradiance from the light sources on the sphere varies relatively smoothly across the sphere. That is the aggregate irradiance from all of the light sources in the sphere varies smoothly over the sphere and on any object outside of the sphere. This aggregation of light sources can roughly be analogized to the aggregation of the gravitation effects of a plurality of distant bodies. It should be understood that this analogy is presented for understanding of aggregation of light sources. There are of course important differences between illumination and gravity. For example, far-field gravitation effects are guaranteed to be smoothly varying through space, while far-field illumination can exhibit higher-frequency effect from obstruction of a source (i.e., shadowing) and other forms of attenuation. As the irradiance on the sphere tends to be relatively smoothly varying, a relatively small number of basis functions may be used to approximate the irradiance on the sphere and outward from the sphere on the surface of the object. Example sets of basis function that may be used for approximating the irradiance on the sphere include spherical harmonics, spherical wavelets, special purpose functions and the like. The foregoing list of basis functions that may be used to model the irradiance is not exhaustive and those of skill in the art will know of other sets of basis function that may be used to model the irradiance on the sphere.

According to one embodiment of the present invention, the approximation of the irradiance on the sphere and outward from the sphere is used to approximate the irradiance on surface 230. Object 240 and its associated surface 230 may be objects in a rendered scene, such as a rendered scene for an animated feature or the like. Approximating the irradiance on an object for a scene or the like is often referred to as image rendering. An image of the object may be rendered by calculating the irradiance from the plurality of light sources on a plurality of pixels on the surface of the object.

According to a specific embodiment of the present invention, a set of spherical harmonic basis function are used to approximate the irradiance from the plurality of light sources on the sphere and out from the sphere onto an arbitrary surface (e.g., surface 230) that may be located at an arbitrary location in space around the sphere and that may be oriented in an arbitrary orientations. The spherical harmonics are often denoted by $Y_{lm}(\theta,\phi)$ where the subscripts are such that $0 \leq l$, and $-l \leq m \leq l$. As $0 \leq l$, and $-l \leq m \leq l$, the spherical harmonics are often represented as a triangular array. For convenience, the triangular array of spherical harmonics is flattened into a linear array. Flattening the triangular array is effectively a re-indexing of the spherical harmonics where a single index "k" is used as the index and $1 \leq k$ $(l+1)^2$ where l is the highest order harmonic present. That is, k varies over a range; it is not given a single value. The angular arguments of the spherical harmonics are also replaced with a unit vector $\bar{u}$, such that linear array of spherical harmonics of order l are denoted as $Y_1(\bar{u}), \ldots, Y_k(\bar{u})$. Note that the standard placement of a bar over a character indicates that the character represents a vector.

Figures 3, 4, 5:
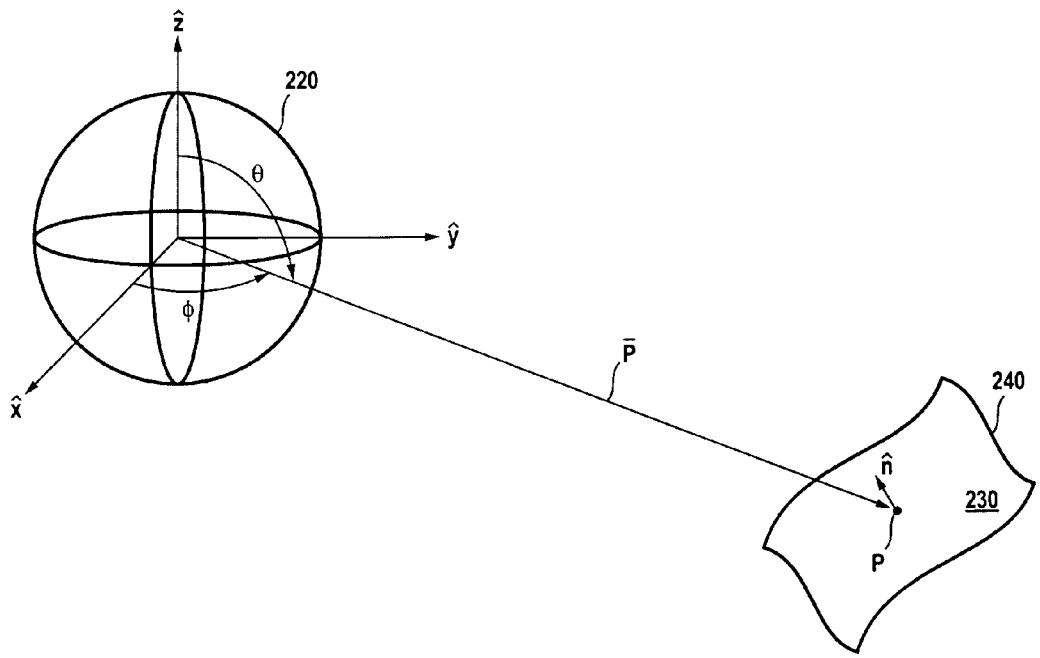
FIG. 3 illustrates a coordinate system centered at the center of the sphere and illustrates various vectors to denote a point "p" on surface.
FIG. 4 illustrates surface being illuminated by light striking the surface from a plurality of directions from the light sources in the sphere.
FIG. 5 illustrates $\overline{Y(u)}$ as a 1×16 vector, M as a 16×9 matrix, R as a 9×3 matrix, and C as a 3×1 matrix according to one embodiment of the present invention.

FIG. 3 illustrates a coordinate system centered at the center of the sphere and illustrates various vectors to denote a point "p" 250 on surface 230.

Point p is denoted by the vector $\bar{p}$, and a surface normal at $\bar{p}$ is denoted by the vector $\bar{n}$. The vector $\bar{p}$ is a function of $\theta$ and $\phi$ wherein $\theta$ is the angular deviation from the z-axis and $\phi$ is the angular measure in the x-y plain. $\bar{p}$ may be written as $\bar{p}=r\bar{u}$ where r is the distance from the origin of the coordinate system centered at the center of the sphere to point p on surface 230.

The irradiance at $\bar{p}$ is denoted by $\Phi(\bar{p},\bar{n})$. At $\bar{p}$, the irradiance is approximate by:

$$\Phi(\bar{p},\bar{n}) \approx 1/(r^2) \bar{Y}(\bar{u}) M R(\bar{n}) C. \quad (1)$$

In equation (1), $\bar{Y}(\bar{u})$ is a vector of spherical harmonic basis functions that is evaluated in the direction $\bar{u}$. M is a matrix of coefficients for the spherical harmonics and encodes the light field on the surface of the sphere and outward from the surface of the sphere. $R(\bar{n})$ is a matrix that rotates the spherical harmonic representation of the clamped cosine lobe to be oriented in the direction $\bar{n}$. C is a vector of spherical harmonic coefficients of the clamped cosine lobe that is oriented along the Z-axis (i.e., up).

The matrix M is described in further detail herein below. M is a matrix whose elements are defined by integrating the product of two spherical harmonic basis functions and the "light" due to all of the light sources in a given cluster of lights. That is, the element in the ith row and jth column is given by:

$$M_{ij} = \int_S \int_L \bar{Y}_i(\bar{u}) \bar{Y}_j(\bar{p}-\bar{u}) \text{light}(\bar{u},\bar{p}) d\bar{p} d\bar{u}$$

where $\int_S$ is the integral over the unit sphere, and $\int_L$ is the integral over the line segment representing the light sources. Points on the sphere are unit vectors, denoted by $\bar{u}$, and points on the line segments are denoted by p. The cluster of light sources is assumed to be scaled and translated so as to be within the unit radius sphere centered at the origin. The function "light$(\bar{u},\bar{p})$" computes the "light" reaching point u from point p on a light source. The term "light" is used here rather than "radiance" because the linear sources are actually non-physical one-dimensional light sources for which the physical concept of "radiance" is not entirely appropriate. For area light sources, the inner integral would be replaced by a double integral, and $\bar{p}$ would then range over surfaces. In the latter instance, "light($\bar{u},\bar{p}$)" might be called "radiance($\bar{u},\bar{p}$)", as the integrated quantity would correspond exactly to the physical quantity of radiance (Watts per steradian per meter-squared).

The size of the matrix M depends on the desired accuracy. By experiment, 16 rows and 9 columns was found to produce a reasonably good approximation for the purposes of computer animation. Both the number of rows and the number of columns can be adjusted independently, but may be perfect squares in the case of spherical harmonic basis functions.

Both integrals in the expression above are computed numerically. The outer integral can be conveniently computed over the sphere by breaking it up into equal-area regions that are approximated by constant functions, and the inner integral (one-dimensional) can be conveniently computed using any quadrature rule, such as Simpson's rule. Note that the size of the matrix M is independent of the accuracy of the respective numerical integrations. That is, regardless of the dimensions of M, the elements of M may be computed with relatively high accuracy using a relatively large number of discrete points over the sphere and over the line segments.

The clamped cosine lobe is described in further detail. Represented as a function of points on the unit sphere (i.e. unit vectors), a clamped cosine is defined, oriented in the direction v, to be the function:

$$f(u) = \max(0, u*v)$$

where "*" denotes the inner product (or "dot product") of two vectors. The connection with the "cosine" is that the dot product of two unit vectors is the cosine of the angle between them. The clamped cosine is referred to as a "lobe" because the clamped cosine looks like a lobe when plotted. The clamped cosine lobe is referred to as being "clamped" because the negative portion of the clamped cosine lobe is set to zero.

Equation (1) may be viewed as consisting of two vectors that are dotted together. The first vector is the expression $1/(r^2)\bar{Y}(\bar{u})M$ and the second vector is the expression $R(\bar{n})C$. The expression $1/(r^2)\bar{Y}(\bar{u})M$ is a vector of spherical harmonic coefficients that represent the light falling on a surface at a point p in space at a distance r from the sphere. The expression $R(\bar{n})C$ is a vector of spherical harmonic coefficients that represent the cosine lobe above surface 230, which is being illuminated. The inner product of these two vectors results in the integral of the cosine-weighted illumination reaching the point p from above.

FIG. 4 illustrates surface 230 being illuminated by light 400 striking surface 230 from a plurality of directions from the light sources in the sphere.

The view of the light striking the surface is not shown to scale for convenience. More specifically, the light is shown striking the surface from a set of angles that may exceed the actual angular spread of the light striking the surface. The figure shows a positive cosine lobe 410 and a negative cosine lobe 420 tangent to the plane of the surface of at point p on the surface. The positive cosine lobe weights the irradiance from the light sources at p. That is, the irradiance at low angles of incidence (e.g., grazing angles) has a relatively low weighting by the cosine lobe as this irradiance has a relatively low effect on the illumination at p. The irradiance at relatively higher angles has relatively higher weighting by the cosine lobe as this irradiance has a relatively higher effect on the illumination at p. The negative cosine lobe represents light striking the surface from the bottom. Light striking the surface from the bottom is not a physical reality in the current problem being solved and will be ignored. While each of the spherical harmonic basis functions (except the constant term) has negative components, the non-negative 'clamped' cosine lobe can be well approximated by a suitable combination of basis functions. Nine spherical harmonic basis functions are included in $R(\bar{n})$ to approximate the top cosine lobe. It has been determined that nine second-order spherical harmonics ($l \leq 2$) may be used to weight the irradiance with a less than five percent error, and in some embodiments, with a less than one percent error. A larger number of spherical harmonics may be used to improve the approximation of the weighted irradiance, but the time cost of rendering images rises to a relatively high level with a relatively small return in improved accuracy in the weighted irradiance approximation.

To elaborate, $R(\bar{n})$ is a 9×3 matrix of second-order spherical harmonics. The rotation matrix $R(\bar{n})$ takes the three non-zero second-order spherical harmonics of the "canonical" cosine lobe (i.e., oriented vertically along the z-axis) to the coefficients of the cosine lobe that is oriented in the direction of the surface normal $\bar{n}$ at the point p of surface 230. According to one embodiment, $R(\bar{n})$ has the following form.

$$\begin{bmatrix} Y_{0,0}(\bar{n}) & 0 & 0 \\ 0 & Y_{1,0}(\bar{n}) & 0 \\ 0 & 0 & Y_{2,0}(\bar{n}) \\ 0 & Y_{1,1}(\bar{n}) & 0 \\ 0 & Y_{1,-1}(\bar{n}) & 0 \\ 0 & 0 & Y_{2,1}(\bar{n}) \\ 0 & 0 & Y_{2,-1}(\bar{n}) \\ 0 & 0 & Y_{2,2}(\bar{n}) \\ 0 & 0 & Y_{2,-2}(\bar{n}) \end{bmatrix} \quad (2)$$

Each row of $R(\bar{n})$ has a single non-zero entry consisting of a single spherical harmonic basis function evaluated in the direction $\bar{n}$. It is noted that the positioning of the elements in the i 9×3 matrix $R(\bar{n})$ shown above depends on how the basis functions are linearly ordered (i.e. when basis functions are labeled with single subscripts 1, 2, . . . , 9).

As discussed above, M is a matrix of coefficients for the spherical harmonics and encodes the light field on the surface of the sphere and outward from the surface of the sphere. $1/(r^2)\bar{Y}(\bar{u})M$ is a vector of spherical harmonic coefficients representing the light field at point $\bar{p}$ (an arbitrary point on the surface).

The elements of the M, which may be a 16×9 matrix, depend on pairs of spherical harmonics, one member of the pair including spherical harmonic basis function up to 2nd order, and the other member of the pair including spherical harmonic basis functions up to 3rd order. These basis functions can be set to any orders desired, although second and third order work quite well.

For a collection of line lights, three M matrices are generated. The three M matrices correspond to red, blue, and green light. The M matrices are calculated one for a collection of line lights. As the M matrices are generated once, prior to use for image rendering and not while an image is being rendered, a tremendous computational savings is provided by embodiments of the resent invention over traditional image rendering techniques for a collection of lights. The M matrices are then used to render a reflection of the line lights on a surface, or more specifically to render a number of points on a surface. The number of points chosen on a surface for which the irradiance is determined is arbitrary, but may be relatively large so that reflection from the surface is rendered with a sufficiently high resolution for computer animation. For example, 10,000, 100,000, 1,000,000 or more points may be chosen on the surface.

According to one embodiment of the present invention, for each surface point p, with normal n, at which irradiance, $\Phi(\bar{p},\bar{n})$, is to be computed, the computation proceeds in four steps: 1) Compute the distance, r, from the center of the cluster of lights to the point p being illuminated. 2) Compute the vector of spherical harmonic basis functions, Y(u), where u is the unit vector pointing from the center of the cluster of lights to the point p being illuminated. 3) Compute the matrix R(n), which depends only on the surface normal n (not the point p). 4) Compute the product $(1/r^2)Y(u) M R(n) C$ using a different 16×9 matrix M for each color component: red, green, blue. This results in three scalars, (r,g,b), representing the irradiance at the point p due to the cluster of lights. The approximate irradiance, (r,g,b), is then used in the shading computation at the point p. That is, any computation that takes account of irradiance to assign a final color to the point p.

FIG. 5 illustrates the expression for the irradiance $\Phi(\bar{p},\bar{n}) \approx 1/(r^2)\bar{Y}(\bar{u})M\ R(\bar{n})C$ in an expanded matrix form. More specifically, FIG. 5 illustrates $\bar{Y}(\bar{u})$ as a 1×16 vector, M as a 16×9 matrix, R as a 9×3 matrix, and C as a 3×1 matrix.

According to one embodiment, the matrix coefficients are calculated via a numerical integration. As described in detail above, each element of M is a double integral containing a product of spherical harmonic basis functions and the illumination due to the collection of light sources. An extra benefit that comes from computing this integral numerically is that the value of "light(u,p)" can include the effects of occlusion; that is, objects that block the light. If there are occluders, their effect will also be approximated.

Figure 6:
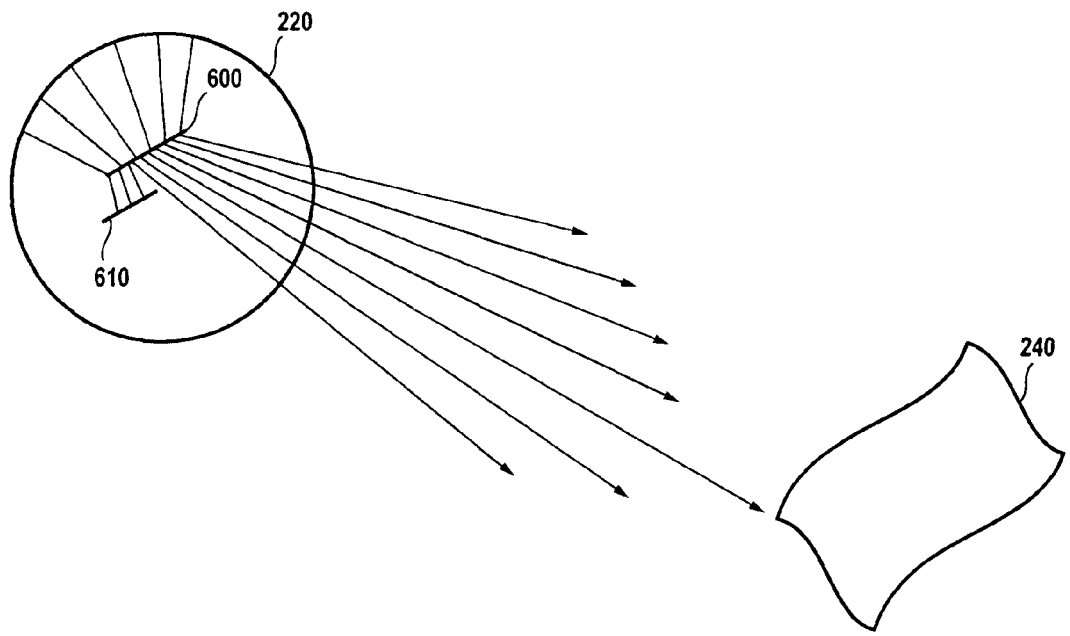
FIG. 6 illustrates a line light disposed in the sphere having an obstruction that partially blocks light from the line light from reaching certain points on the sphere and projecting outward therefrom.

FIG. 6 illustrates a line light 600 disposed in the sphere having an obstruction 610 that partially blocks light from the line light from reaching certain points on the sphere and projecting outward there from.

The contribution of the light from the cluster of light sources within the sphere can be extended arbitrarily far outside the sphere by using an "inverse square" fall-off from the center of the sphere. The computation shown in the four steps above takes both the distance from the center of the sphere into account and the orientation of the surface being illuminated. That is, the contribution of light at small steps along the line light may be summed to determine the contribution of light from the line light. It is particularly pointed out that via the numerical integration of the light from the line lights, that obstructions, such as from other objects, are relatively simply accounted for in the described embodiment of the present invention.

The irradiance over the bounding sphere due to enclosed light sources generally varies quite smoothly, with one exception being in the case of occlusion. Due to this smooth variation, a small number of spherical harmonic basis functions generally suffices, such as 32. That is, the coefficients $a_i$ are functions of $\theta$ and $\phi$ across the surface of the sphere. Therefore the coefficients may be projected onto a set of spherical harmonic basis functions via an integration across the sphere. Once the three M matrices for the sphere are calculated, the lights within the sphere do not need to be referred to again for rendering images of the light from the line lights falling on the surface. One exception to this being for points that fall within the sphere, which we refer to as the near-field. In this case, the approximation using the matrix M is inadequate, so the irradiance must be computed in a more costly way, either by integrating the contributions of all light sources using Simpson's rule, or by evaluating a closed-form expression per light source.

As briefly discussed above, nearly any type of light source may be placed in a modeled sphere and characterized by the foregoing described method. According to a specific embodiment of the present invention, a plurality of line lights may be characterized by the foregoing described method. The line lights may represent a neon sign or the like. As line lights are mathematical lines and not physically realizable by virtue of being infinitely thin, the power emitted from such an entity using radiance is generally not realizable. A model for radiance from a line light is introduced that has the units of watts per meter degree. "Degree" refers to linear angle subtended by the line. "Meter" is introduced to allow the intensity of light to drop of linearly with distance from the line light. This 1/r drop off in the intensity coupled with the dependence on the subtended angle gives the line a physically plausible behavior wherein the irradiance essentially falls off as $1/r^2$ with distance. This $1/r^2$ drop off is exhibited by all physically realizable light sources.

Figure 7A:
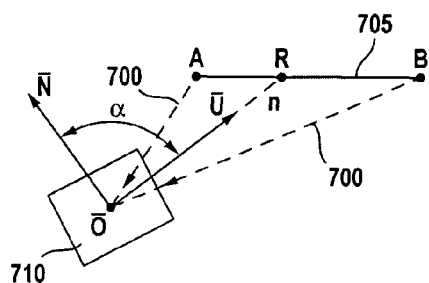
FIGS. 7A and 7B illustrate light from a line light falling on a surface of an object.
Figure 7B:
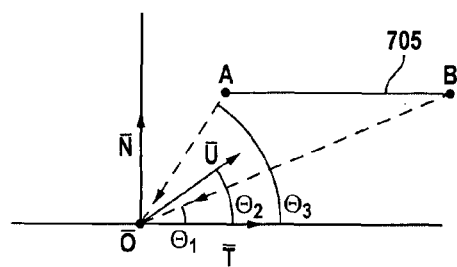

FIGS. 7A and 7B illustrate light 700 from a line light 705 falling on a surface 710 of an object 715.

A method for characterizing the irradiance at the origin $\bar{O}$ on the surface is presently described. The presently described characterization may be used in combination with the above described method for determining the irradiance on the sphere and the irradiance outward there from. This combined use of the presently described characterization with the foregoing described method will be described in further detail below.

The vector $\bar{V}$ in FIG. 7A is the unit normal vector at the origin $\bar{O}$. $\bar{U}$ is a unit vector that points from $\bar{O}$ to the line light as is parameterized by the angle $\theta$. The irradiance $\Phi$ from the line light may be obtained by integrating the product of the radiant intensity between the cosine of the angle $\alpha$ and the corresponding incident direction $\bar{U}$. The irradiance $\Phi$ (in watts per unit area) at the origin $\bar{O}$ due to the unit-intensity of the line light is given by:

$$\mu(\bar{V}) = \int (1/r) \bar{V} \cdot \bar{U}(\theta) d\theta. \qquad (4)$$

The vector $\bar{V}$ is not a function of $\theta'$ and can be removed from the integral. Therefore, the integral may be determined by calculating the integral for the vector irradiance:

$$\Phi = \int (1/r) \bar{U}(\theta) d\theta. \qquad (5)$$

The vector irradiance may be computed analytically by picking a convenient coordinate system. $\bar{U}$ may be parameterized in term of the vectors $\bar{T}$ and $\bar{N}$ shown in FIG. 7. Vectors $\bar{T}$ and $\bar{N}$ are unit vectors that are, respectively, parallel and orthogonal to the line segment. Note that the coordinate system is chosen without consideration for the surface at the origin. The coordinate system may be so chosen as $\bar{V}$ has been removed from the integral. The radius r may be expressed as a function of $\theta$ such that r sin $\theta = l$ where l is the distance from the origin $\bar{O}$ to the line passing through the line light. With this substitution for r, the vector irradiance may be written as:

$$\Phi = \int \bar{U}(\theta) \sin \theta \, d\theta, \qquad (5)$$

wherein the angles are with respect to the T axis. Expressing $\bar{U}(\theta)$ in terms of $\bar{T}$ and $\bar{N}$, $\bar{U}(\theta)$ may be written as:

$$\bar{U}(\theta) = [TN]\begin{bmatrix}\cos\theta \\ \sin\theta\end{bmatrix} = H\begin{bmatrix}\cos\theta \\ \sin\theta\end{bmatrix}$$

where H is a 2×3 matrix. With all of the functions of the integral expressed explicitly in terms of $\theta$, the integral may be calculated from $\theta_1$ to $\theta_2$ (see FIG. 6).

$$\Phi = (1/l)H \int_{\theta_1}^{\theta_2} \begin{bmatrix} \cos\theta\sin\theta \\ \sin^2\theta \end{bmatrix} d\theta \qquad (6)$$

$$\Phi = (1/l)H \begin{bmatrix} -\frac{1}{2}\cos^2\theta \\ \frac{\theta}{2} - \frac{\sin(2\theta)}{4} \end{bmatrix}_{\theta_1}^{\theta_2} \qquad (7)$$

$$\Phi = (1/4l)H \begin{bmatrix} 2\cos^2\theta_1 - 2\cos^2\theta_2 \\ 2(\theta_2 - \theta_1) + \sin(2\theta_1) - \sin(2\theta_2) \end{bmatrix}. \qquad (8)$$

The matrix H carries out the change of coordinates from the convenient 2-dimensional $\overline{T}\ \overline{N}$ system that was chosen for world coordinates. The irradiance may be computed from the vector irradiance by dotting the vector irradiance with the unit normal vector $\overline{V}$, that is $$\mu(\overline{V}) = \overline{V} \cdot \Phi. \qquad (9)$$

Expression (9) is the first order irradiance.

The second order irradiance may similarly be calculated by integrating the radiant intensity with respect to multiple cosine factors and/or cosines raised to powers. Higher-order moments may be used in expanding the incident light field in term of spherical harmonic basis functions. For the first nine spherical harmonic coefficients, the second-order moments are used. The expression for the irradiance at the origin $\overline{O}$ may be written as:

$$\mu^2(\overline{V}_1, \overline{V}_2) = \int_{\theta_1}^{\theta_2} [\overline{V}_1 \cdot \overline{U}(\theta)][\overline{V}_2 \cdot \overline{U}(\theta)] \frac{1}{r} d\theta \qquad (9)$$

Again, the vectors $\overline{V}_1$ and $\overline{V}_2$ may be removed from the integral, and the resulting tensor arising from the outer product of $\overline{U}(\theta)$ with itself may be integrated. The tensor irradiance may be written as:

$$\Phi^2 = \frac{1}{l} \int_{\theta_1}^{\theta_2} \overline{UU}^T \sin\theta \, d\theta \qquad (10)$$

$$\Phi^2 = \frac{1}{l} H \left[ \int_{\theta_1}^{\theta_2} \begin{bmatrix} \cos\theta \\ \sin\theta \end{bmatrix} \begin{bmatrix} \cos\theta \\ \sin\theta \end{bmatrix}^T \sin\theta \, d\theta \right] H^T \qquad (11)$$

$$\Phi^2 = \frac{1}{l} H \left[ \int_{\theta_1}^{\theta_2} \begin{bmatrix} \cos^2\theta \sin\theta & \cos\theta \sin^2\theta \\ \cos\theta \sin^2\theta & \sin^3\theta \end{bmatrix} d\theta \right] H^T \qquad (12)$$

$$\Phi^2 = \frac{1}{12l} H \begin{bmatrix} 3(\cos\theta_1 - \cos\theta_2) + & 3(\sin\theta_2 - \sin\theta_1) + \\ \cos(3\theta_1) - \cos(3\theta_2) & \sin(3\theta_1) - \sin(3\theta_2) \\ 3(\sin\theta_2 - \sin\theta_1) + & 9(\cos\theta_1 - \cos\theta_2) + \\ \sin(3\theta_1) - \sin(3\theta_2) & \cos(3\theta_2) - \sin(3\theta_1) \end{bmatrix} H^T \qquad (13)$$

The inner product of foregoing tensor irradiance may be made with the vectors $\overline{V}_1$ and $\overline{V}_2$ to generate the irradiance.

According to one embodiment, one or both of the irradiance approximations $\mu(\overline{V})$ and $\mu^2(\overline{V}_1, \overline{V}_2)$ may be projected onto the spherical harmonics to generate the coefficients for the matrix M. For example, the irradiance expression may be used in equation (3) above to generate the coefficients for matrix M.

According to one embodiment, a pair of far-field irradiance expression may be generated for a given collection of line lights. For example, one irradiance expression may be generated for a first radius and another irradiance expression may be generated for a second radius that is larger than the first radius. The first and second irradiance expression may have different color blending effects on object in a scene. That is, for the first irradiance expression, colors from different lights in the plurality of lights may be distinctly visible on the object, whereas colors for the second irradiance expression on the object may be relatively less distinctly visible (i.e., more diffusely spread across the object). To control the degree to which irradiance associated with the first expression and the second expression control the irradiance on the object, the first expression may have a different fall off rate than the second expression. For example, the irradiance for the first expression may be forced to fall off as $1/r^3$, and the irradiance for the second expression may be forced to fall off as $1/r^2$.

Figure 8:
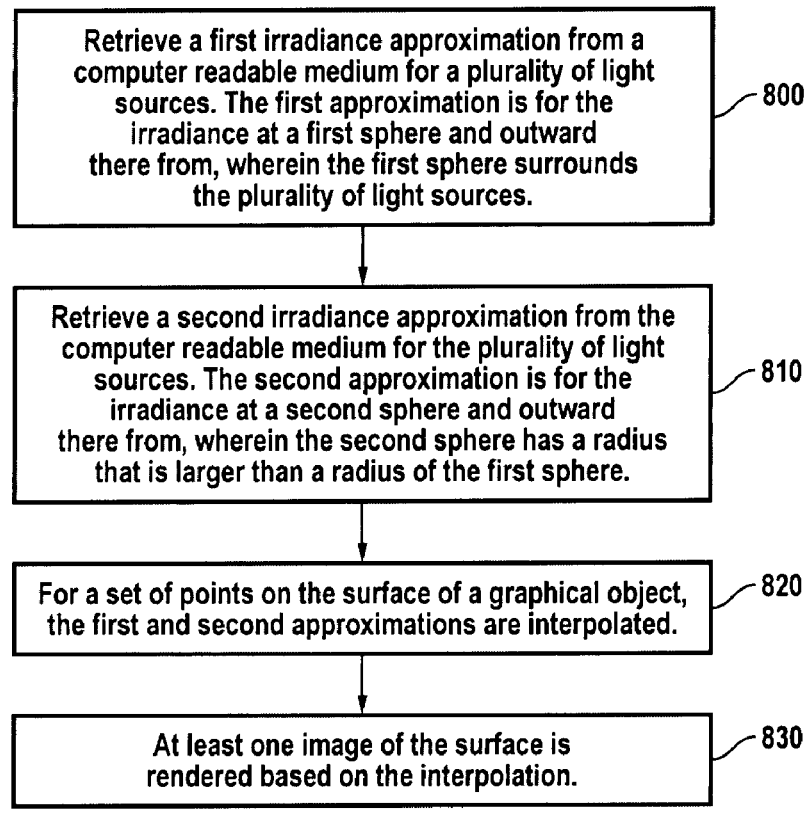
FIG. 8 illustrates a high-level flow chart for a method for a computer system for rendering an image of a surface of a graphical object illuminated by a plurality of lights, such as line lights.

FIG. 8 illustrates a high-level flow chart for a method for a computer system for rendering an image of a surface of a graphical object illuminated by a plurality of lights, such as line lights. More specifically, the high-level flow chart is for one embodiment of the present invention for interpolating the pair of irradiance approximation described immediately above.

Initially, at a step 800, a first irradiance approximation for a plurality of light sources is retrieved from a computer readable medium. The first irradiance approximation is for a first sphere and for an outward projection of irradiance from the first sphere. The first sphere has a first radius and surrounds the plurality of light sources. At a step 810 a second irradiance approximation for the plurality of light sources is retrieved from the computer readable medium. The second irradiance approximation is for a second sphere and for an outward projection of irradiance from the second sphere. The second sphere has a second radius that is greater than the first radius. At a step 820, the first irradiance approximation and the second irradiance approximation are interpolated. At a step 830, at least one image is rendered of a surface illuminated by the plurality of light sources based on interpolating the first and the second irradiance approximations. According to a specific embodiment, the foregoing steps may be repeated to render a plurality of images of the surface to generate a time ordered sequence of images. The time ordered sequence of images may be generated for an animated feature or the like.

According to one embodiment, the expressions for the irradiance expression illustrated in FIG. 4 may be used to render one or more images for an animated feature, a set of still images or the like. For various points on an object in a scene, wherein the object has a matt surface (i.e., non-specular surface), the angular coordinates θ and φ and the radial coordinate r may be entered for these points into the irradiance expression illustrated in FIG. 4 to generate the irradiance values for the points. Generating the irradiance values provides that the light sources characterized by the irradiance expression may be used to rendering the object in the scene. The object may be any object having a matt finish that might be included in an animated scene. For example, the object might be a "person," "vegetation," (e.g., a tree, a bush, etc.) an "inanimate object" (e.g., a car or a portion thereof) or the like.

Figure 9:
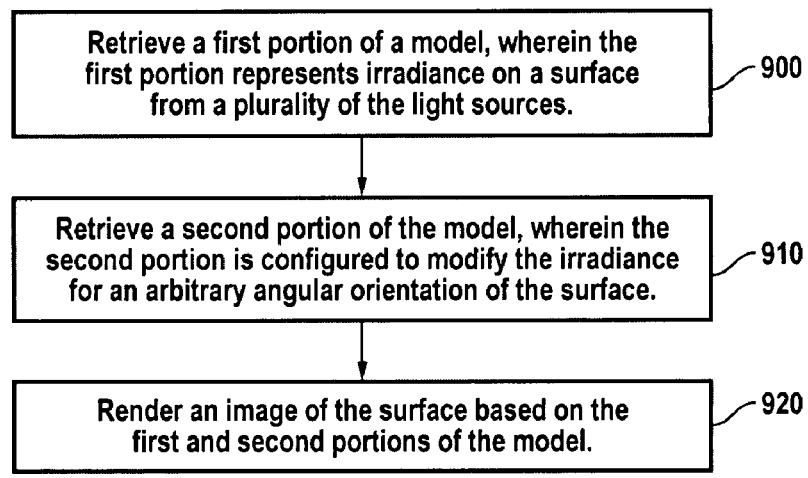
FIG. 9 illustrates a high-level flow chart for a method for a computer system for rendering an image of a surface of a graphical object illuminated by a plurality of lights, such as line lights.

FIG. 9 illustrates a high-level flow chart for a method for a computer system for rendering an image of a surface of a graphical object illuminated by a plurality of lights, such as line lights.

Initially, at a step 900, a first portion of a model for a plurality of light sources is retrieved from a computer readable medium. The first portion of the model specifies irradiance from the plurality of light sources on the surface, which is located at an arbitrary location around the plurality of lights. At a step 910, a second portion of a model is retrieved from the computer readable medium. The second portion of the model is configured for modifying the irradiance on the surface for arbitrary angular orientations of the surface. At a step 920 an image of the surface is rendered. The image includes a rendering of the reflection of the plurality of light sources from the surface based on the first portion and the second portion of the model. According to some embodiments, the foregoing steps are repeated to generate a plurality of images for an animated feature or the like.

Further embodiments can be envisioned to one of ordinary skill in the art after reading this disclosure. In other embodiments, combinations or sub-combinations of the above disclosed invention can be advantageously made. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer method operable on a computer comprises:
    retrieving by the computer from a computer readable medium a first irradiance approximation for a plurality of light sources for a first distance in the midfield from the light sources;
    retrieving by the computer from the computer readable medium a second irradiance approximation for the plurality of light sources for a second distance in the farfield, where the second distance is greater than the first distance; and
    interpolating by the computer the first irradiance approximation and the second irradiance approximation for a point having a third distance from the light sources; and
    generating from the interpolation of the first irradiance approximation and the second irradiance approximation a third irradiance approximation for the point having the third distance from the light sources.

2. The computer method of claim 1, wherein the third distance is greater than the first distance and less than the second distance.

3. The computer method of claim 2, further comprising rendering an image for the point based on interpolation step.

4. The computer method of claim 2, wherein the first irradiance approximation is for a first sphere around the plurality of light sources; and wherein the second irradiance approximation is for a second sphere around the plurality of light sources.

5. The computer method of claim 2, wherein the interpolating step includes:
    diminishing the irradiance associated with the first irradiance approximation with a first function of a first radial distance from the first sphere to the point, and
    diminishing the irradiance associated with the second irradiance approximation with a second function of a second radial distance from the second sphere to the point.

6. The computer method of claim 5, wherein the first function diminishes the irradiance associated with the first irradiance approximation at a higher rate than the second function diminishes the irradiance associated with the second irradiance approximation.

7. The computer method of claim 6, wherein the first function is proportional to the inverse of the first radial distance cubed.

8. The computer method of claim 7, wherein the second function is proportional to the inverse of the second radial distance squared.

9. A computer program product storable on a non-transitory computer readable memory comprises:
    code for retrieving from a computer readable medium a first irradiance approximation for a plurality of light sources for a first distance in the midfield from the light sources;
    code for retrieving from the computer readable medium a second irradiance approximation for the plurality of light sources for a second distance in the farfield, where the second distance is greater than the first distance; and
    code for interpolating by the computer the first irradiance approximation and the second irradiance approximation for a point having a third distance from the light sources; and
    code for generating from the interpolation of the first irradiance approximation and the second irradiance approximation a third irradiance approximation for the point having the third distance from the light sources.

10. The computer program product of claim 9, wherein the third distance is greater than the first distance and less than the second distance.

11. The computer program product of claim 10, further comprising rendering an image for the point based on interpolation step.

12. The computer program product of claim 10, wherein the first irradiance approximation is for a first sphere around the plurality of light sources; and wherein the second irradiance approximation is for a second sphere around the plurality of light sources.

13. The computer program product of claim 10, wherein the interpolating step includes:
    diminishing the irradiance associated with the first irradiance approximation with a first function of a first radial distance from the first sphere to the point, and
    diminishing the irradiance associated with the second irradiance approximation with a second function of a second radial distance from the second sphere to the point.

14. The computer program product of claim 13, wherein the first function diminishes the irradiance associated with the first irradiance approximation at a higher rate than the second function diminishes the irradiance associated with the second irradiance approximation.

15. The computer program product of claim 14, wherein the first function is proportional to the inverse of the first radial distance cubed.

16. The computer program product of claim 15, wherein the second function is proportional to the inverse of the second radial distance squared.

17. A computer system comprises:
    a processor for executing computer code;
    a memory for storing the computer code;
    a bus system for transferring the computer code from the memory to the processor for processing,
    wherein the processor is configured for:
        retrieving from a computer readable medium a first irradiance approximation for a plurality of light sources for a first distance in the midfield from the light sources;
        retrieving from the computer readable medium a second irradiance approximation for the plurality of light sources for a second distance in the farfield, where the second distance is greater than the first distance;
        interpolating the first irradiance approximation and the second irradiance approximation to generate a third irradiance approximation for a point having a third distance from the light sources;

code for rendering an image for the point based on the code for the interpolation; and code for storing image information for the point in the memory.

18. The computer system of claim 17, wherein the third distance is greater than the first distance and less than the second distance.

19. The computer system of claim 18, wherein the processor is further configured for rendering an image for the point based on the interpolation step.

20. The computer system of claim 18, wherein the first irradiance approximation is for a first sphere around the plurality of light sources; and wherein the second irradiance approximation is for a second sphere around the plurality of light sources.

21. The computer system of claim 18, wherein the processor in the interpolating step is further configured for:

diminishing the irradiance associated with the first irradiance approximation with a first function of a first radial distance from the first sphere to the point, and diminishing the irradiance associated with the second irradiance approximation with a second function of a second radial distance from the second sphere to the point.

22. The computer system of claim 21, wherein the first function diminishes the irradiance associated with the first irradiance approximation at a higher rate than the second function diminishes the irradiance associated with the second irradiance approximation.

23. The computer system of claim 22, wherein the first function is proportional to the inverse of the first radial distance cubed.

24. The computer system of claim 23, wherein the second function is proportional to the inverse of the second radial distance squared.

* * * * *